(No Model.)
L. S. EDLEBLUTE.
MECHANICAL MOVEMENT.
No. 451,113. Patented Apr. 28, 1891.
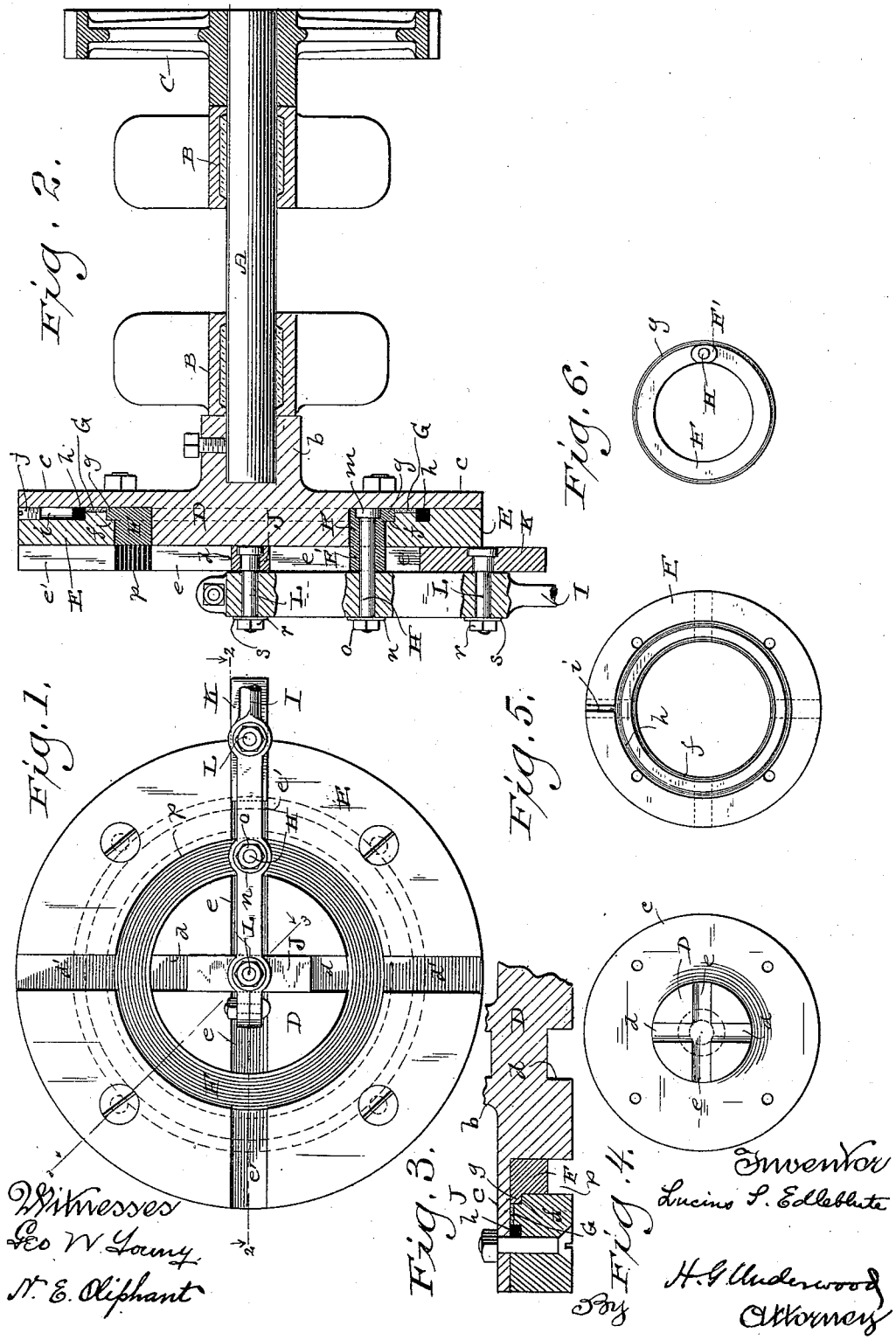
Witnesses
Geo. W. Young
N. E. Oliphant
Inventor
Lucius S. Edleblute
By H. G. Underwood
Attorney

UNITED STATES PATENT OFFICE.

LUCIUS S. EDLEBLUTE, OF SHEBOYGAN, WISCONSIN, ASSIGNOR OF ONE-HALF TO FRED MUELLER, OF SAME PLACE.

MECHANICAL MOVEMENT.

SPECIFICATION forming part of Letters Patent No. 451,113, dated April 28, 1891.

Application filed October 6, 1890. Serial No. 367,146. (No model.)

*To all whom it may concern:*

Be it known that I, LUCIUS S. EDLEBLUTE, a citizen of the United States, and a resident of Sheboygan, in the county of Sheboygan, and in the State of Wisconsin, have invented certain new and useful Improvements in Mechanical Movements; and I do hereby declare that the following is a full, clear, and exact description thereof.

My invention consists in certain peculiarities of construction and combination of parts to be hereinafter described with reference to the accompanying drawings and subsequently claimed.

In the drawings, Figure 1 represents a side elevation of my invention; Fig. 2, a plan view in section on line 2 2 of the preceding figure; Fig. 3, a section on line 3 3 of Fig. 1; Fig. 4, a detail elevation of a portion of a rotary device employed in one form of my invention; Fig. 5, a similar view of another portion of the rotary device; Fig. 6, a like view of a thrust-ring that forms part of said device.

Referring by letter to the drawings, A represents a shaft mounted in bearings B, and fast on one end of the shaft is a gear-wheel C for transmitting power, although a crank, eccentric, or other well-known means may be employed for the same purpose.

Fast on the other end of the shaft A is the hub $b$ of a disk D, the hub side of the latter being provided with a circumferential flange $c$, and its other side with central grooves $d\,e$, these grooves intercepting each other at right angles, as is best illustrated in Fig. 4.

Bolted or otherwise rigidly secured to the flange $c$ of the disk D is a ring E, provided with grooves $d'\,e'$ at right angles to each other and in line with the grooves $d\,e$ in said disk, of which latter the ring is virtually a section. The disk-section E is shouldered at $f$ to oppose a flange $g$ on a ring F, interposed between said section and the disk proper. The disk-section E is also provided with a circular channel $h$, having a radial branch $i$ for the introduction of lubricant, this branch of said channel being normally closed by a screw-plug $j$ or other suitable means. Adjacent to the channel $h$ the inner face of the disk-section E is cut away to form a space for the introduction of a porous packing-ring G, whereby lubricant in said channel is fed to the ring F above described.

A bolt H, having its head $m$ countersunk in the rear side of the ring F, is passed through the latter and a stud F' thereon, and held on the bolt by means of a washer $n$ and nut $o$ is a pitman I, this pitman being provided with blocks J K, that work in the grooves of the disk and its section above described, and are lubricated in their travel across said ring, the stud F' on the latter traveling in a circular space or groove $p$ between the disk proper and its section. The blocks J K are shown loose on bolts L, that pass through the pitman I and engage washers $r$ and nuts $s$, these bolts being in line with the one H above described and having their heads countersunk in said blocks.

The construction thus far described relates to that form of my invention illustrated by Figs. 1 to 6, inclusive, the blocks J K being prevented from disengagement with the disk-grooves, because of the connection of the pitman I with the ring F. The pitman I is shown as it would stand at the completion of its forward stroke, the block J being at the intersection of the disk-grooves $d\,e$ and the other block K as far forward as possible in the continuation $e'$ of said groove $e$, the latter at this time being horizontal. Now if the disk be rotated the pitman will start on its rearward throw because of the pushing force of said disk exerted against the blocks J K in a rotary direction, and consequently these blocks will move in their grooves on lines always at right angles to each other. This rectilinear movement of the blocks in the grooves while the disk is on its rotation causes each block to describe an imaginary ellipse, the minor axis of the ellipse farthest from the outer end of the pitman being equal to the major axis of the other ellipse and at right angles thereto. As there is always a pushing force against at least one of the blocks dead-centers are overcome and the pitman has a steady motion back and forth. By the time the disk has made one-quarter of a revolution the pitman will be at the completion of its rearward throw, the block K at the intersection of the disk-grooves, and the block J as far rearward as possible in the continuation $d'$ of the groove $d$, the latter being horizontal at this time. Continued rotation of the disk keeps up the rectilinear movement of the pitman-blocks in the disk-grooves, but in a reverse direction to that above described, although continuous as to the imaginary ellipses, and thus the pitman is moved on its forward stroke.

It will be apparent from the foregoing explanation that while the disk is making one-half of a revolution the pitman will make two strokes, one back and the other forward. It will also be apparent that each pitman-block revolves twice around its relative imaginary ellipse while the disk is making one revolution, and consequently the pitman has two full strokes alternately in each direction during this revolution of said disk.

Having thus described my invention, what I claim as new, and desire to secure by Letters Patent, is—

1. A mechanical movement comprising a rotary device having one side thereof provided with central grooves that intercept each other at right angles, a loose ring set in the rotary device beyond the grooves and provided with a stud having its path in a circular space that crosses said grooves, a pitman connected to the ring-stud, and blocks on the pitman arranged to engage the aforesaid grooves, substantially as set forth.

2. A mechanical movement comprising a rotary device having one side thereof provided with central grooves that intercept each other at right angles, a loose ring set in the rotary device beyond the grooves and provided with a stud having its path in a circular space that crosses said grooves, a lubricant-channel surrounding the ring within said rotary device, a porous packing interposed between said channel and ring, a pitman connected to the ring-stud, and blocks arranged on the pitman to engage the aforesaid grooves, substantially as set forth.

In testimony that I claim the foregoing I have hereunto set my hand, at Sheboygan, in the county of Sheboygan and State of Wisconsin, in the presence of two witnesses.

LUCIUS S. EDLEBLUTE.

Witnesses.
D. T. PHALEN,
E. DOUGLASS.